United States Patent Office 3,840,455
Patented Oct. 8, 1974

3,840,455
ELECTROLYTIC CELL FOR RECOVERING
METALS FROM SOLUTION
Austin C. Cooley, Thomas W. Bober, and John S. Zankowski, Rochester, N.Y., assignors to Eastman Kodak Company, Rochester, N.Y.
Filed May 25, 1972, Ser. No. 257,025
Claims priority, application Canada, Feb. 23, 1972, 135,530
Int. Cl. C22d 1/02
U.S. Cl. 204—269
14 Claims

ABSTRACT OF THE DISCLOSURE

Referring to FIG. 1 of the drawing, an electrolytic cell comprises a concave dish-shaped member 11 of dielectric material having a base well, and an annular flange 13 projecting from, and advantageously integral with, the base wall. A surface coating 33 of conductive material such as silver or other metal paint is carried on the base wall as a first electrode. A second electrode 19 engages the annular flange and is essentially parallel to the base wall, forming a disc shaped chamber for electrolyte. A generally spiral partition 15 of dielectric material projects from and advantageously is molded integrally with the base wall of concave member 11, and contacts the electrode 19. Inlet and outlet for electrolyte are located adjacent opposite ends of the spiral partition 15. In a preferred embodiment, two such cells are arranged with the second electrode 19 as a common wall, and the electrolyte enters one cell near its periphery at 17, flows spirally to an outlet 20 located in the center of the second electrode 19, enters the other cell, and flows spirally outwardly to an exit 27 adjacent its periphery. The dielectric material desirably is synthetic resin such as polystyrene, phenol formaldehyde, polyethylene, polypropylene, or polyvinyl chloride which can be melted down, or incinerated, or dissolved when the deposited silver or other metal is to be recovered.

BACKGROUND OF THE INVENTION

Field of the Invention

Figure 2:
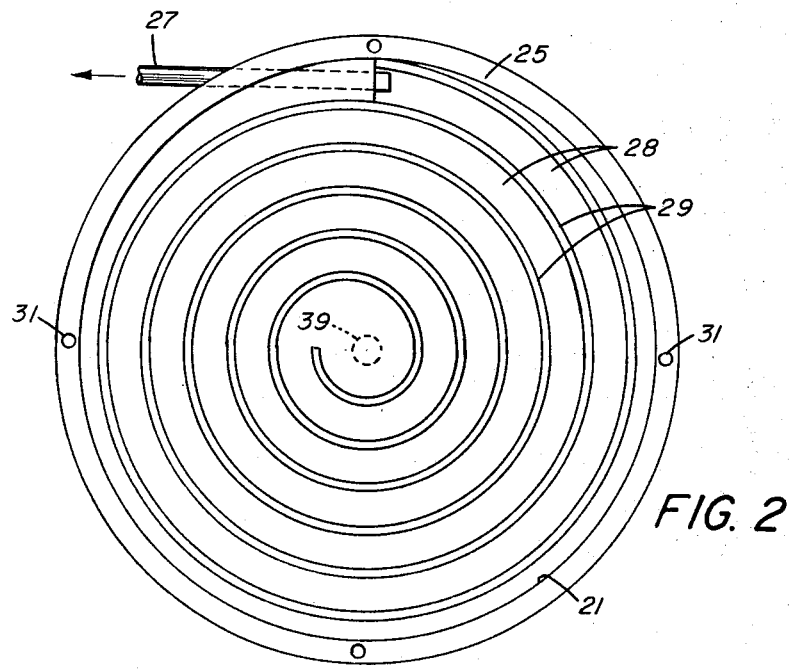

This invention relates in general to an electrolytic cell, and in particular to a novel electrolytic cell for recovering a metal from a solution containing ions of the metal, for example, for recovering silver from exhausted photographic fixing solutions. More specifically, this invention relates to an electrolytic cell through which a metal-ion-containing solution is circulated in order to plate out the metal on one or more cathodes.

Description of the Prior Art

Recovery by electrolytic techniques of a metal from a solution which contains ions of such metal is well known. In its simplest terms, the process involves immersing a pair of electrodes in the electrolytic solution and impressing across the electrodes a voltage of sufficient magnitude to effect migration of the metal ions to the cathode and deposition of the metal on the cathode surface in the form of a coherent plate which is subsequently removed.

Regardless of the design of the apparatus employed, it has long been recognized that effective agitation of the solution must be provided to achieve a reasonable efficiency of recovery. Many of the electrolytic cells heretofore utilized for this purpose provided mechanical agitation of the solution by the use of inter-electrode stirring devices, e.g., rotating paddle wheels or impellers positioned between anode and cathode. Such cells are typically of rather complex construction and must provide a relatively large space between anode and cathode to accommodate the stirring device. As a result of this large electrode spacing, the diffusion path for the metal ions is long and the need for thorough agitation of the solution is correspondingly increased. Moreover, because of the location of the stirring device, only a relatively thin layer of metal can be permitted to build up on the cathode before it becomes necessary to strip it off so as to avoid the possibility of contact with the stirring device.

Electrolytic cells in which agitation of the electrolytic solution is provided solely by means of fluid flow, so that mechanical stirring devices are not needed, have also been proposed heretofore; but these cells confine the solution within an annular chamber between concentrically disposed cylindrical electrodes and, consequently, are usually quite complex in design.

In French Pat. 2,033,327 and in U.S. Pat. 3,751,351, issued Aug. 7, 1973, there are disclosed several forms of electrolytic cells which comprise improvements over the above prior art in that the electrolytic silver or other metal recovery is accomplished in a flat disc-like chamber having a flat metal cathode and a flat metal anode spaced therefrom and parallel thereto. Solution containing ions of the metal to be recovered is circulated through the disc-like chamber while a current flows between the electrodes to cause silver or other metal to deposit on the cathode. In preferred modifications there are two such chambers adjoining one another, using a common electrode therebetween, and the solution is circulated first into and through one of the chambers, and then out of that chamber through an aperture in the common electrode into the second chamber, from which it is discharged.

In application 124,196 the rapid and highly agitated flow of solution through the chambers is assured by providing independent generally spiral partitions of dielectric material in each chamber for guiding the flow between the periphery and the center of each chamber.

In the patent and application described above, all electrodes are solid conductive sheets, and the insulation of one electrode from another is provided by separate spacing elements of dielectric material that are clamped between each pair of electrodes. Moreover, the generally spiral partitions in application 124,196 are separate members of dielectric material which are also clamped between electrodees. While these devices have performed well for the recovery of silver from photographic solutions, they are somewhat more complicated and expensive in construction than desired. Furthermore, when the silver is to be recovered from the common metal cathode, the cathode must be separated from the rest of the cell and shipped back for smelting off the silver. Additionally, the relatively high cost of these cells necessitates their reuse by replacing a removed cathode with another. The dielectric side walls of the chambers tend to accumulate silver thereon and will short circuit the device if reused too often.

SUMMARY OF THE INVENTION

In accordance with this invention, there is provided an electrolytic cell of novel construction which effectively avoids the disadvantages of the apparatus of the prior art referred to hereinabove. As compared with cells comprised of concentrically disposed cylindrical electrodes, the apparatus of this invention has the advantage of greater simplicity in construction, while still eliminating the need for interelectrode stirring devices, and it also provides an improved configuration for current flow with the result that higher current densities than were heretofore feasible can be used.

As compared with the cells of the above patent and application, the apparatus of the present invention is simpler in construction and lower in cost than the previous cells. Moreover, the entire cell is inexpensive enough that the entire cell can be returned to a refiner for silver recovery, and destroyed in the process.

These improvements are attained by providing an electrolytic cell comprising a concave dish-shaped member molded of a dielectric material such as polyvinyl chloride plastic or other synthetic resin having a base and a flange supported by the base projecting therefrom substantially adjacent the periphery. The internal surface of the base carries a surface coating of an electrically conductive material such as silver or other metal paint which constitutes a first electrode of the cell. The cell is completed by providing a separate second electrode which covers at least in part the concave member, tightly engages the flange and is essentially parallel to the bottom wall forming the first electrode, thus forming a disc shaped electrolysis chamber.

A first or entrance conduit for supplying liquid opens into the electrolysis chamber at about its periphery, and a second or exit conduit for discharging liquid opens from the electrolysis chamber at about its center; but the entrance and exit can be interchanged. When electrolysis is to be conducted, the first and second electrodes are connected to opposite sides of a source of direct current, such as a battery or a DC generator.

In a preferred modification a second concave dish-shaped member of dielectric material, similar in construction to the first concave member is located on the opposite side of the second electrode from the first concave member, and forms a second disc-like electrolysis chamber which receives liquid from the center of the first chamber for electrolysis, and then discharges from the periphery of the second chamber. The base of the second concave member also carries on its internal surface an electrically conductive coating which acts as a third electrode. In operation, the first and third electrodes are connected to the same side of the source of direct current, while the second electrode is connected to the other side. With either arrangement, the metal such as silver is plated out onto two electrode surfaces to assure rapid plating and maximum recovery.

Rapid agitated circulation of the solution along a spiral path through the single chamber cell is assured by providing the first concave member with a generally spiral shaped partition or wall of dielectric material which engages the surface of the second electrode when the apparatus is assembled. In a two-chamber cell, both concave members comprise such generally spiral partitions.

Upon completion of a plating operation with this cell (either single or double chambers) the whole cell can be returned to a locality where the plastic parts are melted down, or burned, or dissolved in suitable solvents leaving behind the electrolytically recovered metal such as silver, and any other metal present in the cell.

THE DRAWINGS

Figure 1:
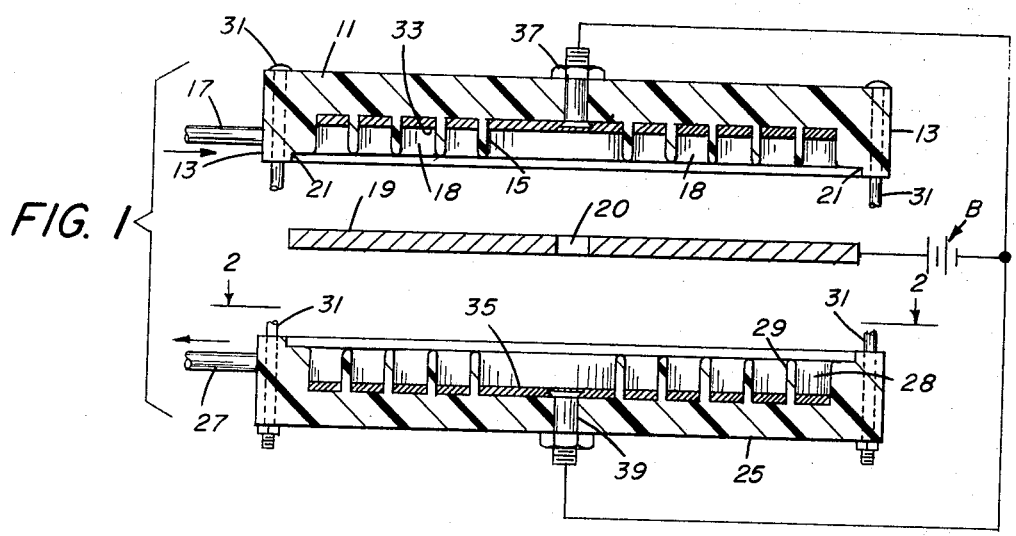

FIG. 1 is an exploded vertical sectional view through an electrolytic cell in accordance with the invention; and
FIG. 2 is a plan view of a part of the cell as viewed from the line 2—2 in FIG. 1.

THE PREFERRED EMBODIMENTS

As shown in the drawings, a first concave cylindrical member 11 is molded from a dielectric plastic material such as polyvinyl chloride with a base, and a flange or wall 13 integral therewith and defining a disc shaped electrolysis chamber. A generally spiral partition 15 in the disc shaped chamber is also integral with member 11. An inlet conduit 17 extends tangentially through the wall 13 into the outer end of a continuous; inwardly turning or spiral passage 18 defined in the disc-shaped chamber between convolutions of the continuous, inwardly turning or spiral partition 15.

A central disc-shaped electrode 19 is adapted to fit against the flange 13, resting on an annular shoulder 21 with its inner surface in contact with the peaks of spiral partition 15 to assure that substantially all electrolyte will travel through the generally spiral passage 18 without by-passing.

A second concave member 25 of dielectric material is essentially a mirror image of (or alternatively is substantially identical to) the first member 11, and mates in the same way with the opposite side of electrode 19. A conduit 27 extends tangentially between the inside and the outside of a second continuous, inwardly turning or generally spiral passage 28 formed in a second disc shaped chamber between convolutions of a second integrally formed continuous, inwardly turning or generally spiral partition 29, for removing electrolyte after silver or other metal has been recovered therefrom.

Solution supplied through conduit 17 flows at high velocity and with agitation through the first generally spiral passage 18 and is discharged through a central aperture or passage 20 in electrode 19 into the center of the second generally spiral passage 28 through which it is guided rapidly and in an agitated manner to the periphery by the second spiral partition, and then is discharged through conduit 27.

The two concave members 11 and 25 are held tightly against electrode 19 in any suitable manner so as to prevent leakage of electrolyte, as by a series of bolts 31 extending through bolt holes in the dielectric plastic flanges, and spaced from the center electrode 19 so as to avoid a short circuit. Gaskets may be used between electrode 19 and mating members if leakage is a problem.

The concave members 11 and 25 are provided with electrically conductive layers or coatings 33 and 35 on the internal base walls thereof between turns of the generally spiral partitions 15 and 29. One suitable way for providing these coatings is to paint on a commercially available silver or other metallic paint and allow the solvent to evaporate therefrom. Among suitable silver paints are Ecobond Solder 56C purchase from Emerson and Cuming of Canton, Mass., and Conductive Silver #500-1 purchased from Bel Fuse Inc. of Jersey City, N.J. Such metal layers can also be applied by electroless plating, with or without subsequent electroplating.

Electrical connections to the conductive coatings are accomplished by metal conductors 37 and 39 which are bolted into the centers of the bases of concave members 11 and 25 and have their heads in electrical contact with the conductive coatings 33 and 35.

In the cell arrangement shown in FIG. 1 the second or central electrode 19 is the anode, connected to the positive side of a battery B; and the first and third electrodes 33 and 35 both are cathodes, connected to the negative side of battery B, so that silver plates out on both the first and third electrodes. However, the opposite polarities can be used, with the electrode 19 being the cathode and the electrodes 33 and 35 being anodes, in which case the plating of silver occurs on both surfaces of the electrode 19.

While a two chamber cell has been described above to exemplify the invention, it is evident that the principles also apply to a single chamber cell wherein there is only one of the plastic concave members 11, and the solution is circulated only through the single disc shaped chamber formed in cooperation with the disc shaped electrode 19.

In addition to polyvinyl chloride as the molded synthetic resin plastic material for the concave members 11 and 25 (including flanges and spiral partitions), other exemplary plastics that may be used are polystyrene, phenol formaldehyde resins, polyethylene, and polypropylene.

It should be noted also that while it is desired that the internal base walls of the concave members be as flat as possible between convolutions of the spiral partitions, plastic molding techniques may require some slight curvature of these walls but this does not alter the essentially flat nature of these members.

The central electrode 19 can be formed of metal or other electrically conductive material such as graphite. Alternatively, this electrode can be a dielectric plastic material such as mentioned above, having a coating of conductive material such as metal or carbon painted or otherwise applied thereon; or it can be molded of such a plastic material containing electrically conductive metal or carbon embedded therein.

A two chamber cell constructed as described above has been tested successfully for recovering metallic silver from electrolytes comprising aqueous photographic fixing solutions containing complex silver salt.

The disc shaped chambers defined within members 11 and 25 are each 13 inches in diameter, the spiral partitions 15 and 29 are 3/16 inch thick, and channel width and depth between turns of the spiral partitions are each 3/4 inch. Each electrode 33, 35 has an area of one square foot (minus the area of the plastic spiral partitions), and central electrode 19 has an area of one square foot on each of two surfaces. The cell is run at a curent density of 5–20 amps/ft.$^2$ with electrodes 33 and 35 cathodic and electrode 19 anodic, and electrolyte is pumped through the cell at a flow rate of 30 liters/min. A good hard silver plate is obtained on both cathodes 33 and 35 when treating electrolyte containing between 0.5 and 10 grams/liter silver.

The invention has been described in detail with particular reference to preferred embodiments thereof, but it will be understood that variations and modifications can be effected within the spirit and scope of the invention.

I claim:

1. An electrolytic cell comprising:
   a concave member of dielectric material having a base,
   a flange integral with said base and projecting therefrom substantially adjacent the periphery thereof, said flange forming a side wall, and electrically conductive material on the internal surface of said base, said conductive material constituting a first electrode of said cell;
   a second electrode engaging said flange and essentially parallel to said internal surface, said second electrode covering said concave member, and forming with said concave member a chamber;
   a partition within said concave member, said non-conductive partition of dielectric material and said flange being so constructed and arranged as to form a continuous, inwardly turning passage for electrolyte extending from the periphery of said concave member to the center thereof;
   and said cell having passage means for passing electrolyte into and out of said chamber comprising an inlet adjacent one extremity and an outlet adjacent the opposite extremity of said partition.

2. An electrolytic cell in accordance with claim 1 also comprising:
   a second concave member of dielectrical material on the opposite side of said second electrode from said first named concave member, said second concave member having a base, a second flange integral with said base and projecting therefrom adjacent the periphery thereof and engaging said second electrode, thereby defining a second chamber; and
   electrically conductive material on the internal surface of the said base of said second concave member, said conductive material constituting a third electrode of said cell;
   said second electrode having an aperture therethrough constituting said outlet from said first named chamber and constituting an inlet to said second chamber for the flow of electrolyte between said chambers;
   and said cell having passage means comprising an outlet for electrolyte from said second chamber.

3. An electrolytic cell in accordance with claim 2 wherein said second chamber has a second non-conductive partition of dielectric material therein, said second partition and said second flange being so constructed and arranged as to form a second continuous inwardly turning passage for electrolyte extending from the periphery of said second concave member to the center thereof;
   and wherein said aperture is at about the center of said second electrode.

4. An electrolytic cell comprising:
   a concave member of dielectric material having a base and a flange supported by and integral with base and projecting therefrom substantially adjacent the periphery thereof, said flange forming a side wall;
   a surface coating of electrically conductive material on the internal surface of said base, said coating constituting a first electrode of said cell;
   a second electrode engaging said flange and essentially parallel to said internal surface, said second electrode covering at least in part said concave member, and forming with said concave member a disc shaped for electrolyte;
   passage means for passing electrolyte into and out of said chamber; and
   a non-conductive generally spiral shaped partition of dielectric material in said chamber, so constructed and arranged as to form a generally spiral passage for flow of electrolyte extending from the periphery of said chamber to the center thereof.

5. An electrolyte cell in accordance with claim 4, wherein said passage means for passing electrolyte into and out of said chamber comprises an inlet adjacent one extremity and an outlet adjacent the opposite extrimity of said partition.

6. An electrolyte cell in accordance with claim 4 wherein said generally spiral shaped partition is integrally formed with said base, and wherein said cell comprises passage means for passing electrolyte into and out of said chamber comprising an inlet adjacent one extremity and an outlet adjacent the opposite extremity of said partition.

7. An electrolytic cell in accordance with claim 6 wherein said surface coating is silver paint.

8. An electrolytic cell in accordance with claim 6 wherein said inlet is adjacent the periphery of said chamber, and said outlet is adjacent the center thereof.

9. An eletrolytic cell in accordance with claim 4, also comprising:
   a second concave member of dielectric material on the opposite side of said electrode from said first named concave member, and having a base, said second concave member having an annular flange integral with said base, projecting therefrom adjacent the periphery thereof and engaging said second electrode, defining a second disc shaped chamber;
   a surface coating of electrically conductive material on the internal surface of said base of said second concave member, said surface coating constituting a third electrode of said cell;
   said second electrode having an aperture therethrough for the flow of electrolyte between said first and second chambers;
   one of said disc shaped chambers having an inlet for electrolyte;
   and the other of said disc shaped chambers having an outlet for electrolyte.

10. An electrolytic cell in accordance with claim 9 wherein said surface coating of electrically conductive material is a coating of metallic paint.

11. An electrolytic cell in accordance with claim 9 wherein said electrode is secured between the respective flanges of said first and second concave members, said second electrode being adapted to be the anode and said coatings on said concave members being adapted to be cathodes.

12. An electrolytic cell in accordance with claim 9 wherein said second electrode is secured between the respective flanges of said first and second concave members, said second electrode being adapted to be the cathode and said coatings on said concave members being adapted to be anodes.

13. An electrolytic cell in accordance with claim 9 wherein said second disc shaped chamber also has a nonconductive generally spiral shaped partition of dielectric material therein; and wherein said aperture is at about the center of said second electrode and said inlet and outlet are located adjacent the peripheries of said chambers.

14. An electrolytic cell in accordance with claim 13 wherein said second electrode comprises a flat disc having opposite surfaces thereof in contact with said spiral partition; wherein said aperture is adjacent the inner extremities of said spiral partition for the passage of electrolyte from said first chamber to said second chamber; wherein each of said concave members has a conduit extending from the inside to the outside thereof adjacent the outer extremities of said spiral partitions; and wherein the base surfaces of said concave members are essentially flat between convolutions of said spiral partition, and are essentially parallel to said second electrode.

References Cited
UNITED STATES PATENTS

| | | | |
|---|---|---|---|
| 3,527,616 | 9/1970 | Landi | 136—120 FC |
| 3,674,675 | 7/1972 | Leaman | 204—290 R |
| 1,906,914 | 5/1923 | Mason | 204—269 |

JOHN H. MACK, Primary Examiner

W. I. SOLOMON, Assistant Examiner

U.S. Cl. X.R.

204—109, 275

PO-1050
(5/69)

UNITED STATES PATENT OFFICE
CERTIFICATE OF CORRECTION

Patent No. 3,840,455        Dated October 8, 1974

Inventor(s) A. C. Cooley, T. W. Bober, J. S. Zankowski

It is certified that error appears in the above-identified patent and that said Letters Patent are hereby corrected as shown below:

Col. 6, line 12, after "with" insert --said--.
Col. 6, line 21, after "shaped" insert --chamber--.
Col. 6, line 30, change "electrolyte" to --electrolytic--.
Col. 6, line 35, change "electrolyte" to --electrolytic--.
Col. 6, line 46, change "eletrolytic" to --electrolytic--.
Col. 6, line 49, before "electrode" insert --second--.
Col. 6, line 70, before "electrode" insert --second--.
Col. 7, line 17, change "partition" to --partitions--.

Signed and sealed this 21st day of January 1975.

(SEAL)
Attest:

McCOY M. GIBSON JR.
Attesting Officer

C. MARSHALL DANN
Commissioner of Patents